United States Patent Office 2,917,567
Patented Dec. 15, 1959

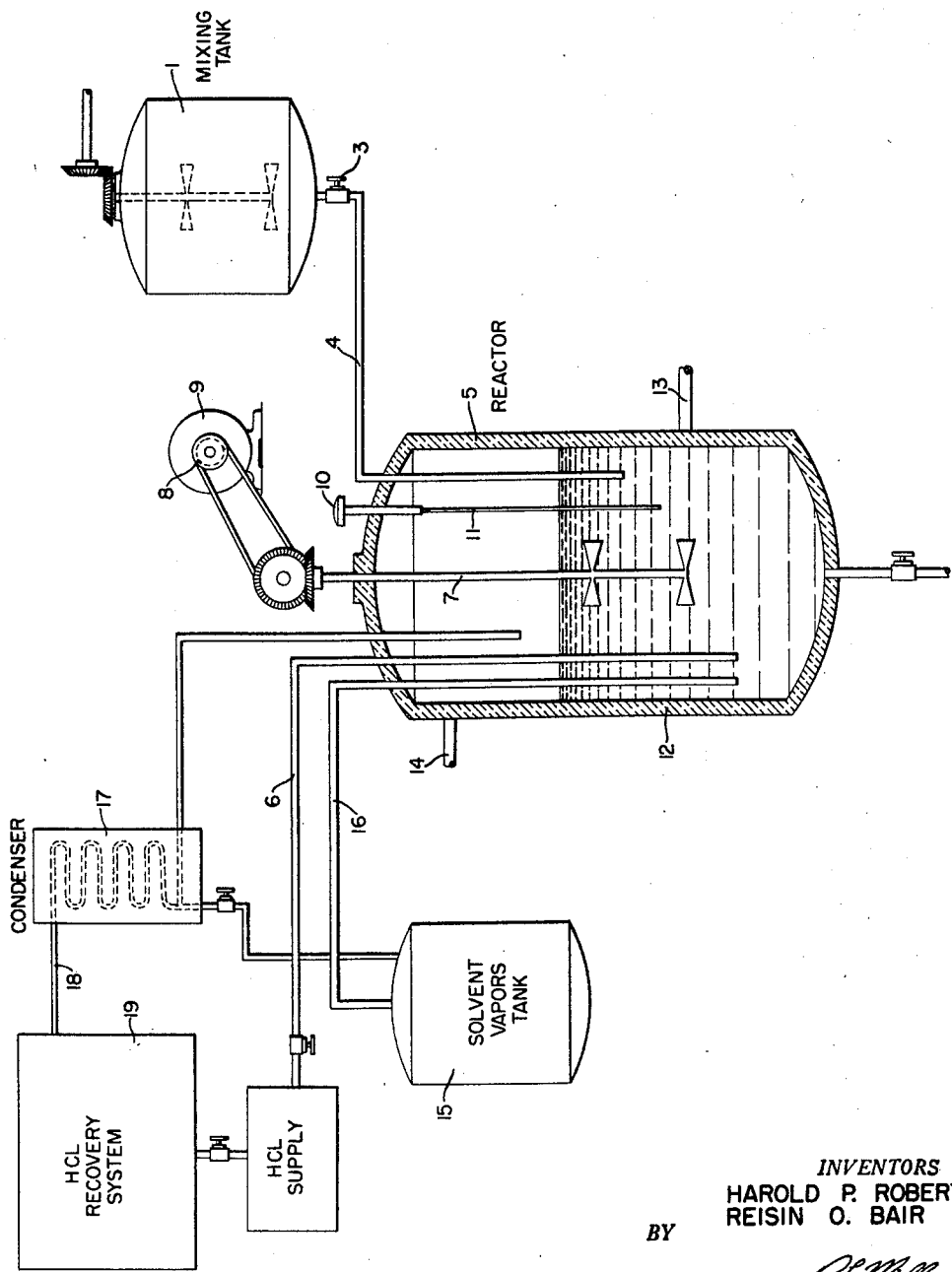

2,917,567

PROCESS FOR REMOVING HYDROGEN CHLORIDE FROM RUBBER HYDROCHLORIDE SOLUTIONS

Harold P. Roberts, Tallmadge, Ohio, and Reisin O. Bair, Hot Springs, Ark., assignors to The Goodyear Tire & Rubber Company, Akron, Ohio, a corporation of Ohio Application January 3, 1956, Serial No. 557,056

4 Claims. (Cl. 260—771)

This invention relates to an improved method for preparing rubber hydrohalides.

Rubber hydrohalides such as rubber hydrochloride have been made by treating rubber dissolved in a suitable solvent with gaseous hydrogen halide such as hydrogen chloride. Generally a large excess of hydrogen chloride is introduced into the rubber cement and allowed to react with the rubber to produce the rubber hydrochloride. The reaction may be carried out at atmospheric pressure, but, in order to speed up the reaction, it is frequently carried out at a pressure of about 10 pounds per square inch in a closed reactor. It is necessary to remove the excess hydrogen chloride from the rubber hydrochloride solution because it not only has a deleterious effect on articles to which rubber hydrochloride is applied, but also it has been found that hydrogen chloride accelerates the decomposition of rubber hydrochloride. In the past, several methods have been used to remove the excess hydrogen chloride from the solution of rubber hydrochloride. The method which has been most extensively used on a commercial basis is described in U.S. Patent 2,237,125 and involves treatment of the rubber hydrochloride solution with a solid alkaline substance which reacts with the excess hydrogen chloride and allows it to be separated as an insoluble product. Soda ash is the solid material which has been most used because it not only reacts with the hydrogen chloride, but also removes any water that may be present. While this method has been used with considerable success, it has some disadvantages and it adds to the cost of the product.

According to the present invention substantially hydrogen chloride free rubber hydrochloride is produced by treating a solution of rubber with hydrogen chloride, allowing the hydrogen chloride to react with the rubber to form rubber hydrochloride and removing the unreacted hydrogen chloride from the solution of rubber hydrochloride by distillation using vapors of the solvent as a carrier to remove the unreacted hydrogen chloride.

The process of this invention may be more clearly understood by referring to the accompanying drawing.

Rubber is dissolved in a suitable solvent such as benzene in mixing tank 1 equipped with a stirrer, and the rubber cement or solution is run through the valve 3 and pipe 4 into reactor 5. Anhydrous hydrogen chloride gas is run through pipe 6 into the rubber solution in reactor 5. The solution is stirred by means of stirrer 7 rotated by means of a pulley 8 and motor 9. The hydrogen chloride is allowed to react with the rubber until the rubber has absorbed the required amount, preferably an amount equivalent to from 29.0 to 30.5 percent by weight of chlorine, based on the rubber hydrochloride. The temperature of the reaction is observed on a thermometer 10 located in thermometer well 11, and is controlled by means of heating or cooling fluid circulated in jacket 12 of reactor 5 through inlet pipe 13 and outlet pipe 14. When the hydrochlorination is completed, solvent vapors, generated in tank 15 are passed through pipe 16 through the rubber hydrochloride solution in reactor 5. The excess hydrogen chloride in the rubber hydrochloride solution is carried by means of the solvent vapors up into condenser 17 in which the solvent vapors are condensed and returned to the reactor 5 or to the solvent vapors tank 15 while the hydrogen chloride gas is removed from top of the condenser through pipe 18 and sent to the hydrogen chloride recovery system 19. Solvent vapors are passed through the rubber hydrochloride cement and the hydrogen chloride is distilled out until substantially all of the hydrogen chloride has been removed from the rubber hydrochloride solution.

By the method of this invention the concentration of free hydrogen chloride in the rubber hydrochloride solution can be reduced to 0.2 percent or less. Thus it is seen that the finished rubber hydrochloride cement is, to all practical purposes, free of hydrogen chloride. If desired, any small amount of hydrogen chloride remaining can be neutralized with ammonia or with some other acid acceptor which is soluble in the rubber hydrochloride. The step of neutralizing the cement with soda ash is eliminated and consequently the difficulties involved in this method of neutralizing rubber hydrochloride cement are avoided.

The method has certain advantages over the previous methods of the art. Some of these advantages are: elimination of the health hazard involved in handling filter cake saturated with benzene; over-all reduction in the amount of hydrogen chloride required to produce rubber hydrochloride because the excess hydrogen chloride is recovered in anhydrous condition and can be used in subsequent batches of rubber hydrochloride; lower cost because soda ash is not required to neutralize the rubber hydrochloride solution; and avoidance of loss of rubber hydrochloride or benzene through being discarded in a filter cake as is the case in the soda ash process.

The example above has illustrated the process with respect to the preparation of a single batch. The invention is equally applicable to a continuous process or to a semi-continuous process in which, for example, the rubber solution is made up in one set of tanks, run into a solution reactor for the initial reaction with hydrogen chloride, and from the solution reactor run into a ripening tank wherein the reaction is allowed to finish while a fresh batch of rubber solution is being reacted in the solution reactor. In this case the condenser would be located on the ripening tank and the hydrogen chloride could be removed from this tank just as in the process illustrated above.

The removal of hydrogen chloride can be carried out at atmospheric pressure, or under reduced pressure by drawing a vacuum on the pipe 18 leading from the condenser 17 in the process described above. The temperature at which the hydrogen chloride is removed will depend on the pressure of the system. The temperature may be regulated by circulating a heating or cooling solution through the jacket 12 of the reactor 5. Preferably, the temperature is controlled so that no incoming vapors are condensed and no solvent is vaporized from the rubber hydrohalide solution so that the concentration of the solution will remain constant. If solvent is vaporized from the solution, the concentration may be adjusted by condensing solvent vapors and returning the condensate to the rubber hydrochloride solution. Similarly, if the rubber hydrochloride solution has become diluted, solvent may be evaporated from the solution and passed out of the system through the condenser or returned to the solvent generator after being condensed in the condenser. Thus, under usual production conditions the process is operated so that there is little or no change in solids content or in the temperature of the cement. Stripping is done adiabatically, the stripping column being insulated to avoid changes in temperature and the pressure being maintained in the system so that there will be no flashing of solvent from the cement nor dilution of the cement by condensation of the stripping vapors.

The process has been particularly illustrated with respect to the use of benzene as the solvent. Other solvents which are solvents for rubber and rubber hydrochloride can also be used. Representative examples of such solvents are toluene, xylene, chloroform and carbon tetrachloride.

While certain representative embodiments and details have been shown for the purpose of illustrating the invention, it will be apparent to those skilled in this art that various changes and modifications may be made therein without departing from the spirit or scope of the invention.

We claim:

1. In a process for preparing rubber hydrochloride which comprises subjecting a solution of rubber in a solvent to the action of hydrogen chloride and removing the unreacted hydrogen chloride from the resultant solution of rubber hydrochloride, the improvement which comprises passing vapors of the solvent through the rubber hydrochloride solution and condensing and returning solvent to the rubber hydrochloride solution to maintain the concentration of the rubber hydrochloride solution constant while removing the hydrogen chloride from the condenser with the uncondensed solvent vapors.

2. In a process for preparing rubber hydrochloride which comprises subjecting a solution of rubber in benzene to the action of hydrogen chloride and removing the unreacted hydrogen chloride from the resultant solution of rubber hydrochloride, the improvement which comprises removing unreacted hydrogen chloride from the rubber hydrochloride solution and keeping the concentration of the rubber hydrochloride substantially constant by passing vapors of benzene through the rubber hydrochloride solution and condensing benzene to maintain the concentration of the rubber hydrochloride solution constant while removing the hydrogen chloride from the condenser with the uncondensed benzene vapors.

3. In a process for preparing rubber hydrochloride which comprises subjecting a solution of rubber in a solvent to the action of hydrogen chloride and removing unreacted hydrogen chloride from the resultant solution of rubber hydrochloride, the improvement which comprises distilling out the unreacted hydrogen chloride by passing vapors of the solvent through the rubber hydrochloride solution to carry the unreacted hydrogen chloride out of the rubber hydrochloride solution.

4. In a process for preparing rubber hydrochloride which comprises subjecting a solution of rubber in benzene to the action of hydrogen chloride and removing the unreacted hydrogen chloride from the resultant solution of rubber hydrochloride, the improvement which comprises distilling out unreacted hydrogen chloride and maintaining the concentration of rubber hydrochloride substantially constant by passing vapors of the solvent through the rubber hydrochloride solution, condensing benzene vapors and returning them to the rubber hydrochloride solution while removing hydrogen chloride from the condenser.

References Cited in the file of this patent

UNITED STATES PATENTS

| 2,441,328 | Osterhof | May 11, 1948 |

FOREIGN PATENTS

| 456,150 | Great Britain | Nov. 3, 1936 |